E. WAGONER.

STRAW-CUTTER.

No. 7,512. Reissued Feb. 13, 1877.

WITNESSES

Henry N. Miller

F. L. Durand

INVENTOR

Elijah Wagoner

Alexander Mason

ATTORNEYS.

N. PETERS, PHOTO-LITHOGRAPHER, WASHINGTON, D. C.

UNITED STATES PATENT OFFICE.

ELIJAH WAGONER, OF WESTMINSTER, MARYLAND.

IMPROVEMENT IN STRAW-CUTTERS.

Specification forming part of Letters Patent No. 165,138, dated June 29, 1875; reissue No. 7,512, dated February 13, 1877; application filed January 20, 1877.

*To all whom it mag concern:*

Be it known that I, ELIJAH WAGONER, of Westminster, in the county of Carroll and State of Maryland, have invented certain new and useful Improvements in Feed-Cutters; and I do hereby declare that the following is a full, clear, and exact description thereof, reference being had to the accompanying drawings and to the letters of reference marked thereon, which form a part of this specification.

The nature of my invention consists in the construction and arrangement of a feed-cutter, as will be hereinafter more fully set forth.

In order to enable others skilled in the art to which my invention appertains to make and use the same, I will now proceed to describe its construction and operation, referring to the annexed drawing, in which—

Figure 1:
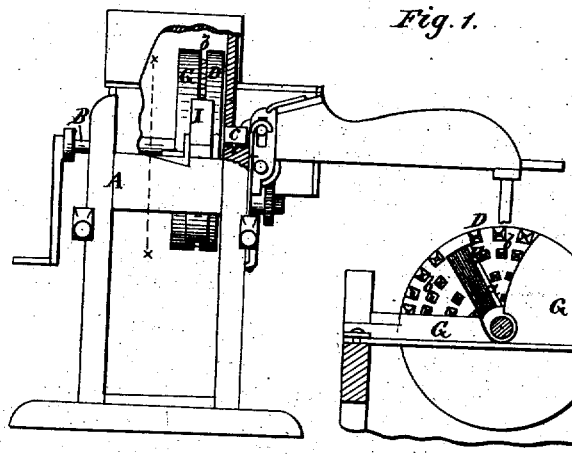
Figure 3:
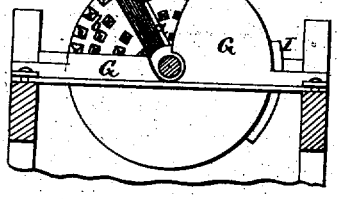
Figure 2:
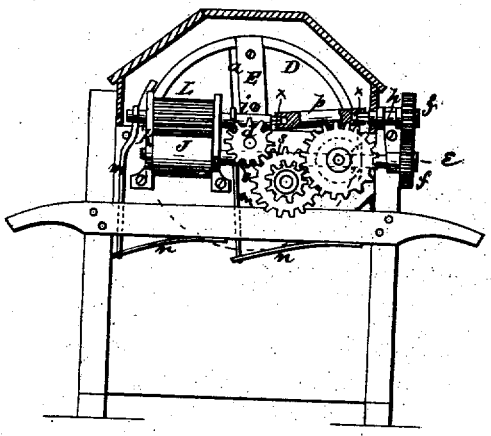

Figure 1 is an end view of my machine. Fig. 2 is a side elevation of the same; and Fig. 3 is a section through the line *x x*, Fig. 1.

A represents the box or frame of my feed-cutter, and B is the main shaft therein. C is the adjustable feed-guide on the front of the box or frame A. On the shaft B is secured a disk, D, which is made concave or recessed on its outer side, and provided with radial slots *a* and cutters or knives E, in the usual manner. On the inner or rear side of the disk D are formed projections *b b*, arranged in concentric circles. Against this side of the disk is placed a circular plate, G, which is cut out for about one-fourth of its area. The plate G is provided with similar teeth or projections as the disk D, and extends from above the feed-guide C downward under the shaft B, and upward on the other side to, at, or above a line horizontal with the shaft. I is a guard fastened to the frame A, against the edges of the disk D and plate G on the side where the feed-guide C is located.

As the knives E cut the feed it passes through the slots *a*, in between the disk D and plate G, where it is crushed and broken by the teeth or projections *b b*, and carried around by the revolving disk D, and discharged at the opening or space cut out of the plate G. This space or opening, being one-fourth the area of the plate, gives ample room for the discharge of the crushed feed without liability of clogging the machine, and allows the shaft B, with its disk D, to be readily removed without disturbing the plate G.

The guard I prevents the escape of the feed at the point where it would be most liable to pass out.

On the front end of the shaft B is a pinion, *d*, which, through suitable intermediate gearing, revolves a horizontal shaft, *e*, along the front side of the box or frame, and provided near one end with a smooth feed-roller, J, within a frame, K, attached to the front of the main frame in front of the feed-guide C. At the other end of the shaft *e* is a pinion, *f*, which gears with a pin, *f'*, on a short shaft, *h*.

Above the smooth feed-roller J is a longitudinally-corrugated roller, L, the journals *i i* of which pass through vertical slots in the frame K. Over these journals are passed hooks *m m*, connecting with springs *n n* attached to the frame A.

The inner end of the shaft *h* and the end of the inner journal *i* of the roller L are provided with square tenons *x x*, as shown in Fig. 3, and these tenons are connected by a shaft, *p*, having square recesses or sockets in its ends to fit over the square tenons *x x*.

The upper corrugated feed-roller L is thus revolved by means of the pinions *f f'*, and this roller will yield at either or both ends, according to the thickness of the feed passing between the feed-rollers, without interfering with the operating-gear, or in any way changing the position of the upper pinion *f'*.

By thus connecting the feed-roller with the pinion *f'* through the medium of the yielding shaft *p*, either the roller or the pinion can be removed from the frame independently, as the shaft is removable from either of the square tenons *x* of the same.

Having thus fully described my invention, what I claim as new, and desire to secure by Letters Patent, is—

1. In a feed-cutter, the combination of feed-rolls, a revolving disk provided with knives and slots, and having a roughened crushing surface, and a stationary plate provided with roughened crushing surface, for the purposes set forth.

2. In combination with the corrugated yielding feed-roller L, the journal *i*, having square tenon $x$, the operating-pinion $f'$, shaft $h$ of the operating-pinion, having also square tenon $x$, and connecting-shaft $p$, having square recesses or sockets in its ends, substantially as and for the purposes herein set forth.

3. The combination of the revolving disk D, provided with slots $a$, knives E, and teeth or projections $b$, and the circular stationary toothed plate G, having a cut or opening, substantially as and for the purposes herein set forth.

4. The combination of the guard or fender I, secured to the frame A, with the disks B and G, as and for the purposes set forth.

In testimony that I claim the foregoing I have hereunto set my hand this 6th day of January, 1877.

ELIJAH WAGONER.

Witnesses:
JNO. A. MACKINTOSH,
G. W. HOLLINGER.